United States Patent [19]

Hirabayashi

[11] Patent Number: 4,829,461
[45] Date of Patent: May 9, 1989

[54] APPARATUS FOR DETECTING SEQUENTIAL DATA STRING

[75] Inventor: Kazunori Hirabayashi, Tokyo, Japan

[73] Assignee: Ando Electric Co., Ltd., Tokyo, Japan

[21] Appl. No.: 65,543

[22] Filed: Jun. 23, 1987

[30] Foreign Application Priority Data

Jun. 27, 1986 [JP] Japan ................................. 61-151217

[51] Int. Cl.[4] .............................................. G06F 7/04
[52] U.S. Cl. ................................................ 364/715.11
[58] Field of Search .................... 340/146.2; 364/715, 364/715.11

[56] References Cited

U.S. PATENT DOCUMENTS

| 4,725,812 | 2/1988 | Kloppe | 340/146.2 |
| 4,728,925 | 3/1988 | Randle et al. | 340/146.2 |
| 4,734,676 | 3/1988 | Huon et al. | 340/146.2 |
| 4,748,438 | 5/1988 | Mickeal | 340/146.2 |

Primary Examiner—David H. Malzahn
Attorney, Agent, or Firm—Seidel, Gonda, Lavorgna & Monaco

[57] ABSTRACT

An apparatus for detecting a succession of data comprises a comparator storing first and second data, respectively, a first flip-flop having an input supplied with the first data from the comparator, a gate having inputs supplied, respectively, with the second data from the comparator and the output of the first flip-flop, a second flip-flop having an input supplied with the output of the gate, and a pulse generator operating in synchronism with input data to produce a shift pulse signal delayed relative to the input data for a time required for the operation of the comparator. The shift pulse signal is applied to the inputs of the first and second flip-flops to thereby cause the output of the first flip-flop to be shifted to the second flip-flop only when the input data corresponding to the first and second data, respectively, are applied to the comparator. Thus, continuity in the input data can be detected. By providing additionally a selector on the output side of the flip-flops, identification of the data contained in the input data string can be accomplished.

2 Claims, 4 Drawing Sheets

APPARATUS FOR DETECTING SEQUENTIAL DATA STRING

BACKGROUND OF THE INVENTION

1. Field of the Invention

The present invention relates to an apparatus for detecting a succession of data and more particularly directed to a continuous or sequential data detecting circuit in which a plurality of comparison circuits corresponding to a plurality of input data are provided to constitute a comparator, wherein an output data signal is produced only when the number of input data corresponding to that of the outputs of the comparison circuits are applied sequentially and continuously to the comparator.

2. Description of the Prior Art

There has been prior known a continuous data detecting circuit of the type mentioned above, as is disclosed, for example, in Japanese Patent Application Laid-Open No. 109047/1982 (JP-A-No. 57-109047). This known circuit however suffers a drawback that a great number of circuit components such as memory, latch circuit, comparator, timing circuit, counter, selector, flip-flops and others are required, giving rise to a problem that the circuit configuration becomes much complicated and expensive.

SUMMARY OF THE INVENTION

Accordingly, it is an object of the present invention to provide a continuous data detecting circuit of a simplified structure which differs essentially from that of the prior known circuit mentioned above.

The above object can be accomplished according to the present invention by using a comparator, flip-flops, a gate and a pulse generator.

More specifically, in view of the above object, there is proposed according to an aspect of the present invention an apparatus for detecting a succession of data, which apparatus comprises a comparator storing first and second data, respectively, a first flip-flop having an input supplied with the first data from the comparator, a gate circuit having inputs supplied, respectively, with the second data from the comparator and the output of the first flip-flop, a second flip-flop having an input supplied with the output of the gate circuit and a pulse generator operating in synchronism with input data to produce a shift pulse signal delayed relative to the input data for a time required for the operation of the comparator, wherein the shift pulse signal is applied to the inputs of the first and second flip-flop to thereby cause the output of the first flip-flop to be shifted to the second flip-flop only when the input data corresponding to the first and second data, respectively, are applied to the comparator.

According to another aspect of the present invention, there can be additionally provided a selector having inputs connected to the outputs of the first and second flip-flops, respectively, for selecting one of the outputs of both the flip-flops under the command of a control input signal.

The above and other objects, features and advantages of the present invention will be more apparent upon reading the following description of the preferred embodiments taken in conjunction with the accompanying drawings.

DETAILED DESCRIPTION OF THE PREFERRED EMBODIMENTS

Now, the invention will be described in detail in conjunction with exemplary embodiments thereof by reference to the accompanying drawings.

Figure 1:
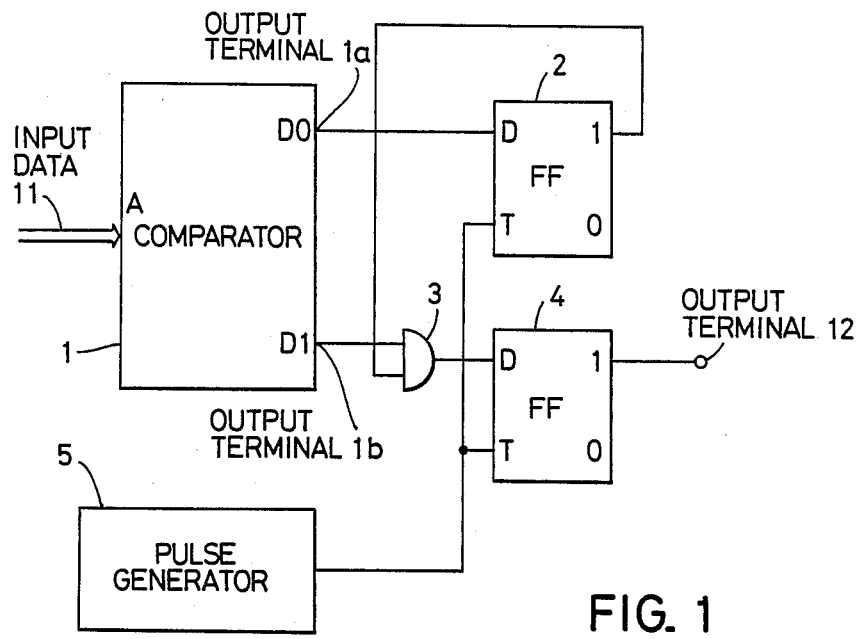
FIG. 1 is a circuit diagram showing a general arrangement of a continuous data detecting apparatus according to an exemplary embodiment of the present invention.

Referring to FIG. 1 which shows a continous data detecting apparatus according to an embodiment of the invention, reference numeral 1 denotes a comparator, 2 denotes a first flip-flop, 3 denotes a gate circuit, 4 denotes a second flip-flop, 5 denotes a pulse generator, and 12 denotes an output terminal, wherein input data are collectively designated by reference numeral 11.

Although in the embodiment illustrated in FIG. 1, the comparator 1 is constituted by a memory, it should be understood that the former may also be realized by using conventional comparison circuits. The comparator 1 is so designed as to store therein at least first and second data. The input data 11 is applied to the comparator 1 as address inputs.

Figure 2:
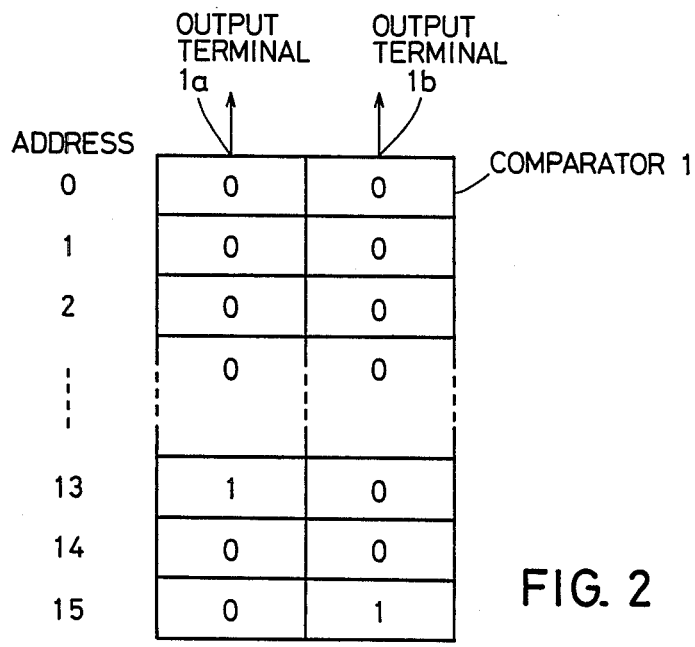
FIG. 2 is a view for illustrating data storage status of a memory employed as a comparator (1) in the continuous data detecting apparatus shown in FIG. 1.

Next, the storage status of the comparator 1 will be explained by referring to FIG. 2. The comparator 1 includes addresses "0", "1", ..., "15", and arranged in such a manner that upon application of the input data 11 to the comparator 1 which corresponds to the address "13", the first data is produced from a first output terminal 1a of the comparator 1, while application of the input data 11 corresponding to the address "15" of the comparator 1 results in appearance of the second data at a second output terminal 1b.

The output signal produced at the output terminal 1a of the comparator 1 is applied to a D-terminal of the first flip-flop 2.

Both the flip-flops 2 and 4 have T-terminals, respectively, to which the output pulses of the pulse generator 5 are applied. The output pulse signal of the pulse generator 5 is produced in synchronism with the input data 11 to be utilized as a shift pulse signal with a delay corresponding to a time required for the operation of the comparator 1. It should be mentioned that instead of using the pulse generator 5, a signal contained in the input data 11 may be derived and passed through an appropriate delay circuit whose output pulse is then utilized as the shift pulse signal.

The gate circuit 3 has two inputs to which the second output data of the comparator 1 and the output of the flip-flop 2 are applied, respectively. The output of the gate circuit 3 in turn is applied to a D-terminal of the second flip-flop 4.

Next, operation of the continuous data detecting circuit shown in FIG. 1 will be described by referring to a timing chart shown in FIG. 3.

Figure 3:
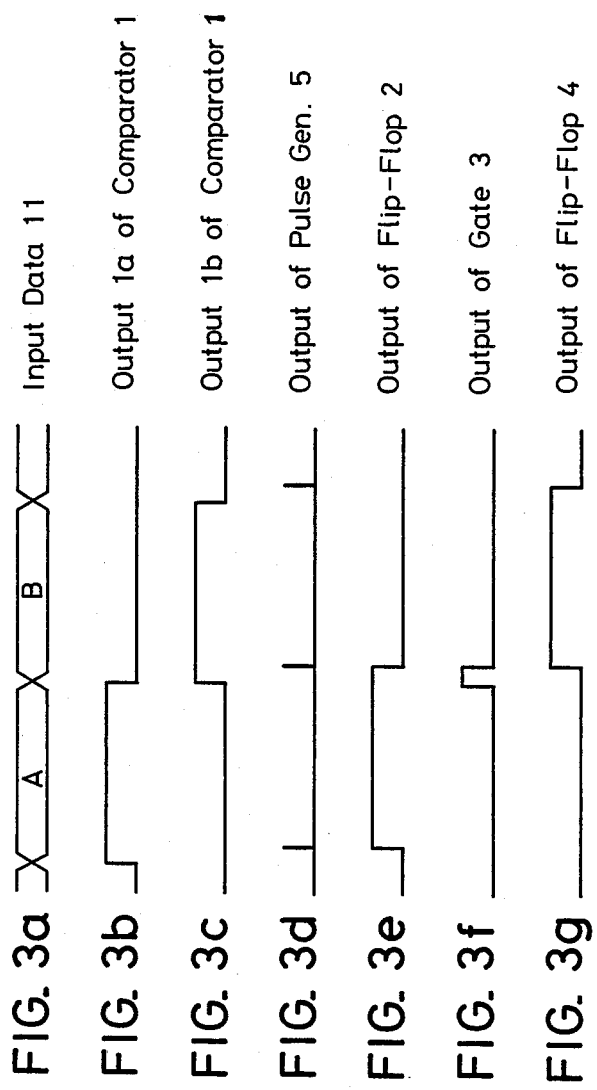
FIGS. 3a–3g are timing charts for illustrating operation of the continuous data detecting apparatus shown in FIG. 1.

There is illustrated in FIG. 3 at (a) a waveform of the input data in which a data block A contains data corresponding to the one stored at the address "13" of the comparator 1, while a data block B contains data corresponding to the one stored at the address "15" of the comparator 1.

The output signal produced from the output terminal 1a of the comparator 1 has a waveform illustrated at (b) in FIG. 3 with the output signal produced from the output terminal 1b of the comparator 1 being illustrated at (c) in FIG. 3.

Shown at (d) in FIG. 3 is a waveform of the output pulse signal of the pulse generator 5 which is applied to the T-terminals of the flip-flops 2 and 4, respectively.

The output waveform of the flip-flop 2 is illustrated at (e) in FIG. 3. As will be seen, the waveform (e) corresponds to the waveform (b) of the output 1a of the comparator 1 applied to the input of the flip-flop 2 and is transferred to the output thereof in response to the pulse of the waveform (d) produced by the pulse generator 5.

Shown at (f) in FIG. 3 is an output waveform of the gate circuit 3. As will be seen, the gate circuit 3 is enabled (i.e. turned on) during application of the waveforms (c) and (e) shown in FIG. 3.

Shown at (g) in FIG. 3 is a waveform of the output signal of the flip-flop 4. As will be seen, the flip-flop 4 produces the output signal when the input data corresponding to the one located at the address "13" of the comparator 1 and the data corresponding to the one stored at the address "15" are successively applied in this sequential order. In the case of the embodiment under consideration, no output is produced from the flip-flop 4 unless the input data 11 applied thereto are in the sequential order mentioned above. In this way, it is possible to detect the sequentially continuing data with the aid of the circuit arrangement shown in FIG. 1.

Figure 4:
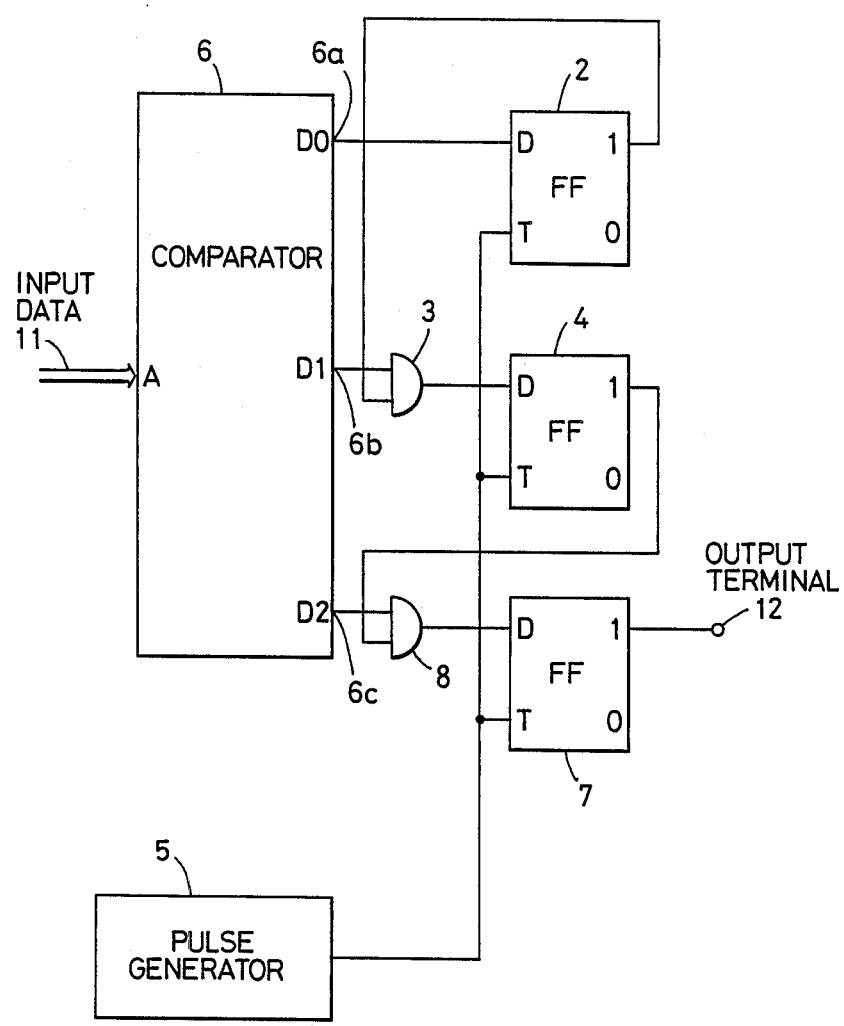
FIG. 4 is a circuit diagram showing another embodiment of the continuous data detecting apparatus according to the present invention.

FIG. 4 shows another embodiment of the present invention which is adapted for detecting an input data string including three sequential data blocks.

In FIG. 4, reference numeral 6 denotes a comparator, 7 denotes a flip-flop, 8 denotes a gate circuit. Other reference numerals denote same or like components as those shown in FIG. 1. In the case of the embodiment shown in FIG. 4, it is assumed that the comparator is also implemented in the form of a memory.

The comparator 6 is provided with three output terminals 6a, 6b, and 6c, wherein the output signal produced at the terminal 6c is applied to the gate circuit 8.

The output terminals 6a and 6b of the comparator 6 shown in FIG. 4 correspond functionally to the output terminals 1a and 1b, respectively, shown in FIG. 1.

With the circuit arrangement shown in FIG. 4, the continuous data detecting apparatus can produce an output signal when three input data blocks 11 are successively applied to the comparator 6.

It will be seen from the above description made with reference to FIGS. 1 and 4 that the data detecting apparatus can be so modified or extended that continuity or succession of more than three input data blocks can be detected by adding the flip-flop and the gate circuit while modifying correspondingly the comparator configuration.

Figure 5:
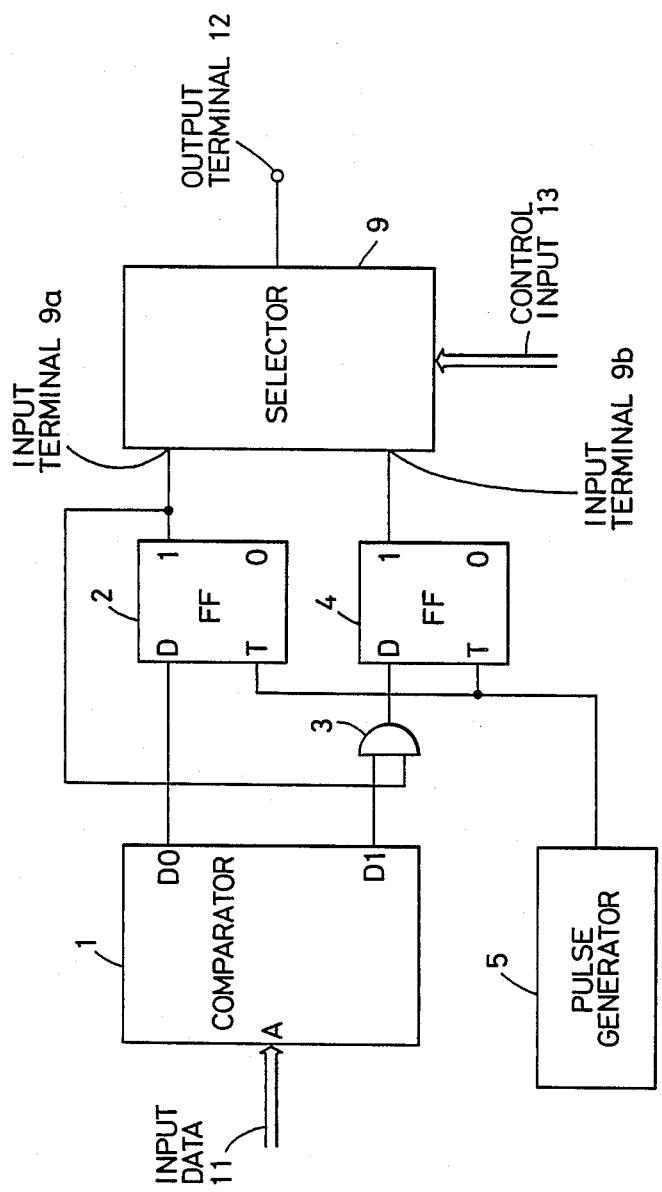
FIG. 5 is a circuit diagram showing a further embodiment of the continuous data detecting apparatus according to the present invention.

FIG. 5 shows still another embodiment of the present invention. In this figure, a reference numeral 9 denotes a selector. The remaining circuit components are same as those shown in FIG. 1.

The selector 9 shown in FIG. 5 has a pair of input terminals 9a and 9b and a control input 13. Under the command of the control input 13, either one of the input 9a or 9b is taken out through an output terminal 12.

In the case of the embodiment shown in FIG. 5, the output terminal of the flip-flop 2 is connected to the input terminal 9a of the selector 9, while the output terminal of the flip-flop 4 is connected to the input terminal 9b.

By controlling the selector 9 such that the output of the flip-flop 2 is taken out from the output terminal 12, it is possible to ascertain that the input data string 11 includes the data corresponding to the first data stored in the comparator.

On the other hand, when the selector 9 is so controlled that the output of the flip-flop 4 is selected to be outputted from the terminal 12, it can be assured that the input data string 11 containing data corresponding to the first and second data is applied continuously or successively to the comparator 1.

By controlling the selector in this manner, the supply of predetermined data to the comparator 1 in succession can be discriminatively detected.

The circuit arrangement shown in FIG. 5 is realized on the basis of the data detecting circuit shown in FIG. 1. It should however be understood that modifications of the circuit arrangement shown in FIG. 5 applicable to the apparatus including three or more flip-flops as shown in FIG. 4 can readily occur to those skilled in the art. In the latter case, the data structure of the input data string 11 can also be recognized.

As will be appreciated from the foregoing description, with the data detecting apparatus according to the invention in which the output is produced from the flip-flop of the final stage only when predetermined input data are successively or continuously applied to the comparator, it is possible to detect the continuity of the input data string. Additionally, by virtue of the provision of the selector, discriminative detection can be accomplished between the supply of predetermined data and the successive supply of the predetermined data in a sequential order.

Although the invention has been described in conjunction with the exemplary embodiments, many modifications and changes will readily occur to those skilled in the art without departing from the spirit and scope of the invention, being understood that the invention is therefore never restricted to the disclosure.

I claim:

1. An apparatus for detecting a sequence of data units in a data signal, comprising:
   a comparator having first and second data units stored therein and adapted to individually output the stored data units when the comparator receives as input an input data signal containing data units corresponding to said stored data units;
   a first flip-flop having an input supplied with said first stored data unit from said comparator;
   gate means having inputs supplied, respectively, with said second stored data unit from said comparator and the output of said first flip-flop;
   a second flip-flop having an input supplied with the output of said gate means; and
   pulse generating means operating in synchronism with the input data signal to produce a shift pulse signal delayed relative to said input data signal for a time required for the operation of said flip-flops;

wherein said shift pulse signal is applied to the shift inputs of said first and second flip-flops to cause the output of said first flip-flop to be applied to said second flip-flop only when the input data signal contains data units corresponding to said first and second stored data units in sequence.

2. An apparatus for detecting a sequence of data units in a data signal, comprising:

a comparator having first and second data units stored therein and adapted to individually output the stored data units when the comparator receives as input an input data signal containing data units corresponding to said stored data units;

a first flip-flop having an input supplied with said first stored data unit from said comparator;

gate means having inputs supplied, respectively, with said second stored data unit from said comparator and the output of said first flip-flop;

a second flip-flop having an input supplied with the output of said gate means;

pulse generating means operating in synchronism with the input data signal to produce a shift pulse signal delayed relative to said input data signal for a time required for the operation of said flip-flops; and selector means having inputs supplied, respectively, with the outputs of said first and second flip-flops, for selectively producing either the output of said first flip-flop or the output of said second flip-flop under the command of a control input signal.

* * * * *